United States Patent [19]
Najand et al.

[11] Patent Number: 5,918,833
[45] Date of Patent: Jul. 6, 1999

[54] HYDRAULIC TORQUE RESTRAINT SYSTEM

[75] Inventors: Mohammad J. Najand, Los Angeles; Michael R. Teeter, Winnetka; Kenneth E. Keith, Los Angeles, all of Calif.

[73] Assignee: Applied Power Inc., Butler, Wis.

[21] Appl. No.: 08/784,877

[22] Filed: Jan. 16, 1997

[51] Int. Cl.⁶ .................................................. B64D 27/00
[52] U.S. Cl. ............................................. 244/54; 248/556
[58] Field of Search .............................. 180/300; 244/54; 188/322.19, 321.11; 248/554, 555, 556, 557

[56] References Cited

U.S. PATENT DOCUMENTS

| | | | |
|---|---|---|---|
| 4,236,607 | 12/1980 | Halwes et al. | 188/379 |
| 4,667,764 | 5/1987 | Sawada et al. | 180/300 |
| 5,127,607 | 7/1992 | McGuire | 244/54 |
| 5,362,094 | 11/1994 | Jensen | 280/689 |
| 5,495,923 | 3/1996 | Bruski et al. | 188/322.19 |

*Primary Examiner*—Christopher P. Ellis
*Assistant Examiner*—Faye M. Fleming
*Attorney, Agent, or Firm*—Quarles & Brady

[57] ABSTRACT

A suspension system attaches an engine to a vehicle frame and includes resilient mounts that are relatively soft with respect to vibrational movement of the engine along horizontal and vertical axes. This soft connection reduces transmission of vibration from the engine to the vehicle frame. The suspension system also provides a pair of hydraulic restrainers mounted on opposite sides of the engine which react equally, but in opposite directions to loads. The hydraulic restrainers are relatively stiff with respect to torsion that results from engine rotation, yet is soft with respect to translational movement of the engine.

17 Claims, 3 Drawing Sheets

HYDRAULIC TORQUE RESTRAINT SYSTEM

BACKGROUND OF THE INVENTION

The present invention relates to resilient supports for dampening vibration from being transmitted between a vibrating body and a structural member that supports the body; and more particularly to supports which attach an aircraft engine to a fuselage.

Aircraft engines can induce significant vibration into the airframe. If left unchecked, induced vibrations not only create objectionable noise within the aircraft cabin, but also may result in serious fatigue of the airframe.

As a consequence, the engine typically is attached to the airframe by a mount which includes some form of a vibration absorbing or dampening mechanism to reduce transmission of vibrations from the engine to the airframe. One configuration of such a mounting system is described in U.S. Pat. No. 2,705,118 and utilizes a pair of resilient mounts which feature an elastomeric material connecting a bracket on the engine with a member of the airframe. Each mount has a chamber formed between the elastomeric material and the airframe member that is filled with hydraulic fluid under pressure. The fluid filled chambers provide a system that is relatively stiff with respect to torsion that results from engine rotation, yet is soft with respect to translational movement of the engine. With this vibration/torsion dampening system, care must be taken in selecting the hydraulic fluid and the elastomeric material so the fluid does not cause deterioration of the elastomeric material. In addition, that stiffness of the torsion dampening is adversely affected by the resiliency of the elastomeric material which forms a wall of the fluid chambers.

SUMMARY OF THE INVENTION

A general object of the present invention is to provide a resilient mounting system for reducing the transmission of vibrations between a body which is a source of vibration and a structural member that supports the body.

Another object is to provide a mechanism for mounting a vibrating body to a support structure in a manner that provides high torsional stiffness to react to torque loads of the body, while maintaining low translational stiffness to minimize the transmission of vibrations from the body to the support.

A further object of the present invention is to provide a mount which incorporates a first assembly of an elastomeric coupling between the body and the support, in addition to a separate hydraulic subassembly coupled to the body for torsional restraint. Because these subsystems are physically separated, the elastomeric material and the hydraulic fluid utilized do not adversely interact.

These and other objectives are satisfied by a suspension system which comprises a first resilient mount which connects one side of the engine to the frame and which has a plate directly connected to the engine. A second resilient mount connects an opposite side of the engine to the frame and also includes a plate directly connected to the engine. In the preferred embodiment, first and second resilient mounts each have pads of elastomeric material abutting opposite surfaces of the plate and sandwiched between a pair of mounting plates. Each of the resilient mounts has an aperture through which a fastener, such as a bolt, extends to attach the resilient mount to the frame of the vehicle.

The suspension system further comprises a first hydraulic restrainer having a first body fixedly attached to the frame. A bore is formed in the first body and a first piston is slideably received within the first bore to define a first chamber which contains hydraulic fluid. The first piston is coupled to the plate of the first resilient mount, wherein the torque exerted by the engine urges the first piston to reduce the first chamber in volume. A second hydraulic restrainer is coupled to the plate of the second resilient mount and has a second body fixedly attached to the frame with another bore in the second body. A second piston is slideably received within this other bore thereby defining a second chamber containing hydraulic fluid. The second piston is coupled to the plate of the second resilient mount so that the torque produced by the engine urges the second piston to reduce the second chamber in volume. A conduit connects the first and second chambers thereby permitting the flow of hydraulic fluid therebetween.

The resilient mounts provide a relatively soft connection for vertical and horizontal translation of the engine with respect to the frame. This soft connection reduces vibration transmission between the engine and the frame. The hydraulic restrainers provide a relatively stiff coupling between the engine and the airframe structural member with respect to torsional movement of the engine. As a result this support system provides both a relatively low degree of freedom (high stiffness) in the torsional direction and a high degree of freedom (relative softness) along the translational axes.

DETAILED DESCRIPTION OF THE INVENTION

Figure 1:
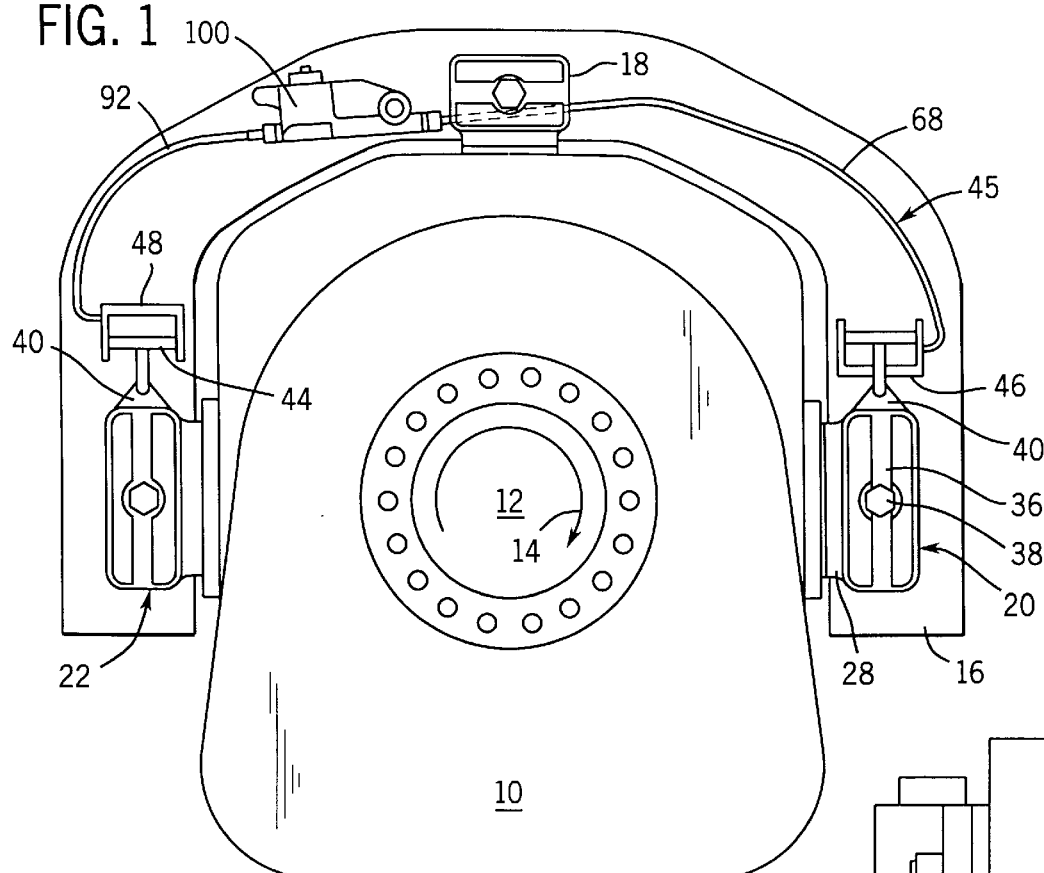
FIG. 1 is a schematic view of an aircraft engine attached to the airframe by a mounting system according to the present invention.
Figure 2:
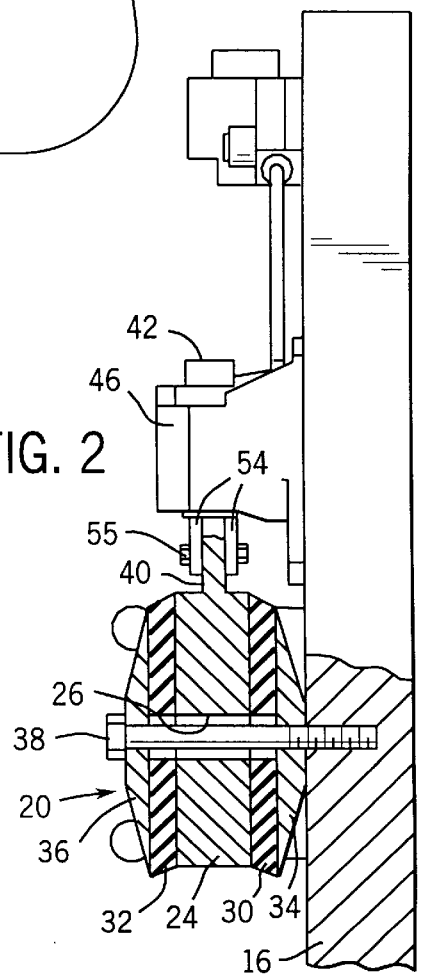
FIG. 2 is an orthogonal view to that of FIG. 1 showing the right side of the mounting system.

Referring initially to FIGS. 1 and 2, an aircraft engine 10 has a shaft 12 which rotates to drive a propeller (not shown). The propeller induces a positive torque in a direction indicated by arrow 14. For turboprop engines the torque is expected to be positive, except for brief transient periods during which a relatively small negative torque is produced. The engine 10 is attached to a structural member 16 of the airframe by a suspension system 15 that includes three resilient mounts 18, 20 and 22. Resilient mount 18 is connected between an upper portion of the engine housing and the structural member 16. The other two resilient mounts 20 and 22 are connected between the right and left sides of the engine, respectively, and supporting structural member 16 on opposite sides of the torque axis of the engine. Additional resilient mounts may be provided as necessary to support the engine. Under normal load conditions, the resilient mounts 18–22 provide a relatively soft connection for vertical and horizontal translation of the aircraft engine 10 with respect to the airframe structural member 16 and reduce transmission of vibration therebetween. The mounts also provide structural support which limits engine deflection under ultimate load and failure conditions.

Each of the resilient mounts 18–22 is similar with the details of the right resilient mount 20 being shown in FIG. 2. This resilient mount 20 has a metal rectangular center plate 24 with a large circular aperture 26 centrally located therein. A mounting bracket 28 seen in FIG. 1 projects from one side of the center plate 24 and is bolted to the frame of the engine 10. Referring again to FIG. 2, pads 30 and 32 of a suitable elastomeric material, such as natural rubber, abut the front and rear major surfaces of the center plate 24. Each of the pads 30 and 32 also has a large centrally located aperture extending therethrough and aligned with central aperture 26 in the center plate 24. The assembly of the center plate 24 and the pads 30 and 32 is sandwiched between inner and outer mounting plates 34 and 36, which have relatively small holes in comparison to the apertures in the intermediate assembly.

A fastening bolt 38 extends through the apertures in the right resilient mount 20 and is threaded into a hole in the airframe structural member 16. The diameter of the apertures through the two pads 30 and 32 and the center plate 24 are significantly greater than the outer diameter of the fastening bolt 38 so that the center plate 24 may vibrate with the engine 10 and not strike the bolt. The sandwiched structure of the resilient mount 20 provides a relatively soft coupling of the engine 10 to the airframe structural member 16 that provides low translational stiffness in the horizontal and vertical axes to minimize the transmission of vibrations from the engine to the supporting structural member.

As shown in FIGS. 1 and 2, the right and left side resilient mounts 20 and 22 have a tab 40 extending upward from the center plate 24 that is attached directly to the engine 10. As used herein, the phrase "directly connected" means connected in a manner in which forces produced by the engine are transmitted to the center plate without an intermediate mechanism providing significant dampening of those forces. An aperture is provided through each tab 40. The engine suspension system also includes a hydraulic torque compensation mechanism 45 which comprises two hydraulic restrainers 46 and 48. The first hydraulic restrainer 46 is adjacent to the right resilient mount 22 and is attached to the structural member 16 of the airframe by several bolts. The first hydraulic restrainer 46 has a pair of ears 54 that are coupled by bolt 55 to the tab 40 on the central plate 24 of the adjacent resilient mount 20. The primary function of the hydraulic torque compensation mechanism 45 is to act as a stiff torsional spring in reaction to engine torque.

Figure 3:
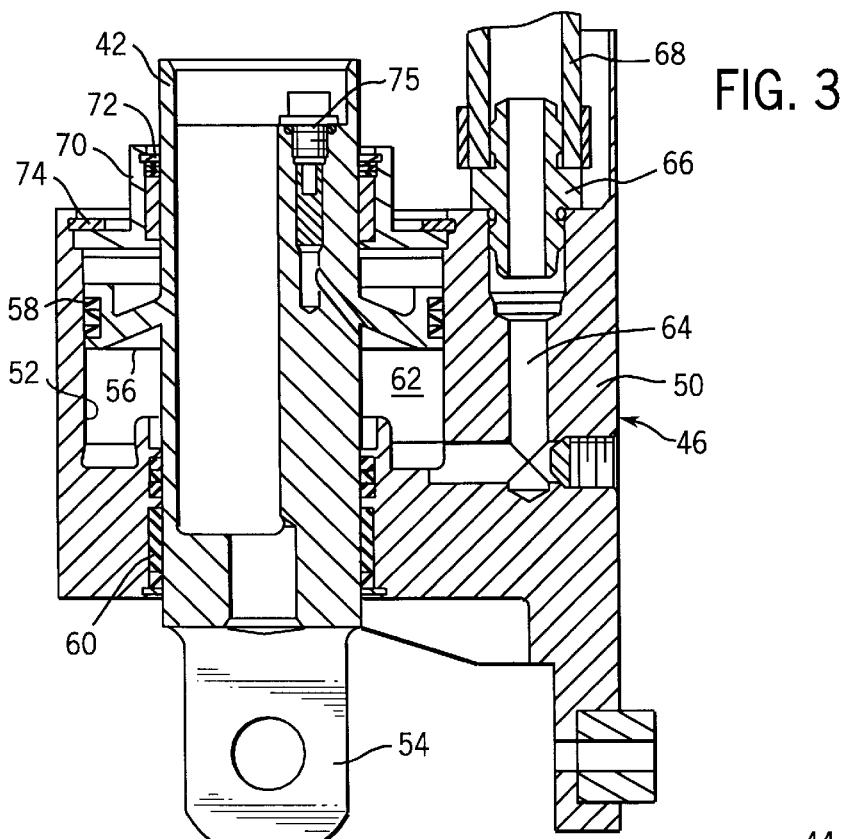
FIG. 3 is a cross-sectional view through the right hydraulic restrainer in FIG. 1.

Referring to FIG. 3, the first hydraulic restrainer 46 has a metal cylinder body 50 with a vertical, circular bore 52 within which a metal piston 42 is received in a slidable manner. An annular flange 56 extends around the piston 42 within the cylinder bore 52 and has an outer perimeter groove with a resilient ring 58 therein to provide a fluid tight seal with the wall of the bore 52. Another seal 60 extends around the piston 42 in the upper portion of the bore 52 thereby defining a fluid tight chamber 62 within the bore 52 below the annual flange 56. A passage 64 is provided from the chamber 62 to the outside surface of the first hydraulic restrainer 46 and a fitting 66 connects a rigid, metal tube 68 to the outside end of that passage. The restrainer chamber 62 and the passage 64 are filled with a relatively incompressible fluid, which may be of any of several types, such as silicone fluids, glycols or polyglycols. Within the piston 42 is a conventional hydraulic bleeder valve 75 which can be opened to allow air trapped within the fluid chamber 62 to escape and be replaced by fluid from tube 68.

At the upper end of the cylinder bore 52 is a cap 70 with an aperture through which the piston 42 extends and an inner resilient seal 72 provides a fluid tight seal between the piston and the cap. The cap 70 is held in place by an annular snap ring 74 which engages an inner groove within the bore 52 of the cylinder body 50.

The second hydraulic restrainer 48 adjacent to the left resilient mount 22 is similar in construction to the first hydraulic restrainer 46 with metal piston 44 extending through a circular bore 76 in a metal cylinder body 78. An annular flange 80 projects around the piston 44 and engages the cylindrical wall of the bore 76 with a sealing ring 82 therebetween. Another seal 84 between the upper end of the bore 76 and the piston 44 defines a fluid chamber 86 above the annular flange 80. The chamber 86 is connected via a passage 88 and a fitting 90 to a rigid, metal tube 92 and is filled with the same fluid as the other hydraulic restrainer 46. The lower end of the bore 76 is closed by a cap 96 and seal 98 through which the piston 44 extends. The second hydraulic restrainer 48 has a bleeder valve 94 which may be opened to allow air trapped within the chamber 86 to escape and be replaced by fluid from tube 92.

The two hydraulic restrainers 46 and 48 are similar except that the fluid chamber 62 in the first hydraulic restrainer 46 is beneath its piston flange 56, while the fluid chamber 86 in the second hydraulic restrainer 48 is above its piston flange 80. The significance of this orientation of the two fluid chambers 62 and 86 will become apparent subsequently with respect to a description of the operation of the system.

Referring once again to FIG. 1, the remote ends of the two fluid tubes 68 and 92 from the first and second hydraulic restrainers 46 and 48 are connected to an accumulator/reservoir 100 positioned on the structural member 16 above the engine 10. Alternatively, the accumulator/reservoir 100 could be incorporated into the body or piston of one of the hydraulic restrainer 46 or 48. The accumulator/reservoir 100 pressurizes the fluid under a no load condition to ensure optimum system function despite changes in environmental variables, such as altitude and temperature. Fluid from the accumulator/reservoir 100 also allows adjustment of the cylinder chambers in the event of a transient negative torque during which the cylinder chambers expand.

Figure 5:
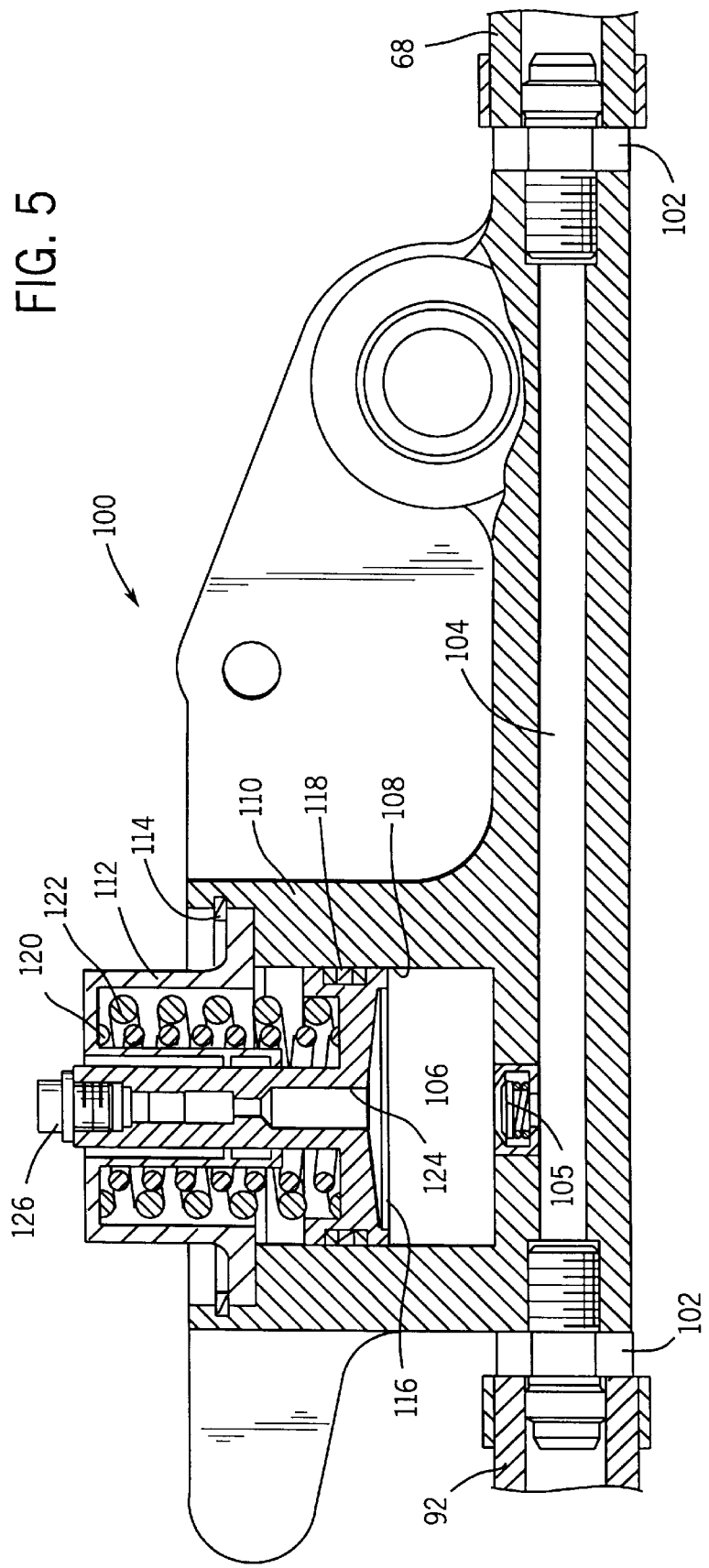
FIG. 5 is a cross-sectional view through an accumulator/reservoir of the mounting system.

The details of the metal accumulator/reservoir 100 are shown in FIG. 5. The two rigid tubes 68 and 92 are connected by fittings 102 to a cross passage 104 through the accumulator/reservoir 100. A reservoir cavity 106 is formed within a vertical, circular bore 108 in the body 110 of the accumulator/reservoir 100. A cap 112 seals the open end of the bore 108 and is held in place by a snap ring 114. A check valve 105 is positioned in a passage between the reservoir cavity 106 and the cross passage 104. The check valve 105 opens whenever the pressure od the fluid in the reservoir cavity 106 is more the 5 psi greater than the fluid pressure in the cross passage 104. The fluid can flow in either direction through the check valve 105 depending upon the condition that causes the valve to open. For example, fluid will flow from the reservoir cavity 106 into the cross passage 104 under negative engine torque conditions and will flow back into the reservoir cavity when the negative torque is removed.

Slidably located within the bore 108 is a control piston 116 with annular seals 118 that engage the side wall of the reservoir bore 108. A pair of coil springs 120 and 122 coaxially extend between the inside of the cap 112 and the control piston 116. The control piston 116 has a passage 124 extending therethrough with a threaded filler valve 126, similar to the bleeder valves 75 and 94, which closes the passage. Alternatively, a pressurized bladder type accumulator/reservoir could be used.

The hydraulic torque compensation mechanism 45 can be filled with fluid while the engine is stopped by attaching a supply hose to the filler valve 126 and then opening the valve. Pressurized hydraulic fluid is fed through the supply hose and filler valve 126 into cavity 106 in the accumulator/reservoir 100. While this is occurring the bleeder valves 75 and 94 of both hydraulic restrainers 46 and 48 are opened to allow air escape from the hydraulic compensation mechanism 45. Once the air has been bled from the system, the bleeder valves 75 and 94 are closed and hydraulic fluid is continued to be pumped into the reservoir cavity 106 until a desired pressure (e.g. 100–120 psi) is achieved. At that time, the filler valve 126 is closed and the supply hose disconnected. The combination of the control piston 116 and coil springs 120 and 122 maintain the pressure of the hydraulic fluid in the reservoir cavity 106 at the desired pressure. The check valve 105 allows hydraulic fluid from the reservoir cavity 106 to enter the cross passage 104 so that the pressure of the fluid in the two hydraulic restrainers 46 and 48 does not drop below the desired pressure.

When the engine 10 is operating, torque in direction indicated by arrow 14 in FIG. 1 is transferred directly to the center plates 24 of each resilient mount 18, 20 and 22. Because these center plates 24 of the two side mounts 20 and 22 are coupled directly by tab 40 to the pistons 42 and 44 of the two hydraulic restrainers 46 and 48, the engine torque is translated into a force which tends to compress the fluid within the respective hydraulic restrainers. Alternatively, these pistons 42 and 44 could be connected by another member to the engine 10 and not via the center plates 24 of resilient mounts 20 and 22. The combination of the two interconnected pistons 42 and 44 react equally, but in opposite vertical directions, to loads through hydrostatic pressure of the fluid. The engine torque is translated into two equal and opposite vertical loads which act on each piston to apply pressure to the fluid in the restrainers interacting with the pistons.

Figure 4:
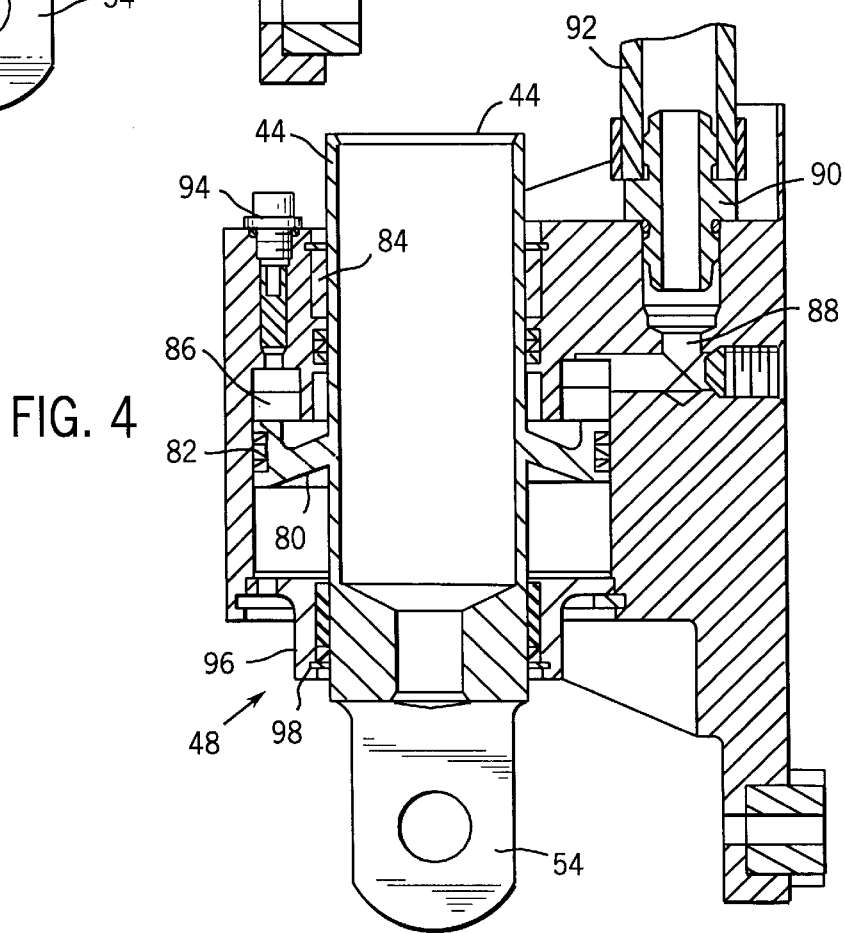
FIG. 4 is a cross-sectional view through the left hydraulic restrainer in FIG. 1.

The torque transferred to the left mount 22 tends to force the associated piston 44 in an upward direction. As seen in FIG. 4, this movement urges the piston flange 80 upward reducing the volume of the cylinder chamber 86 and compressing the fluid therein. Similarly, the transfer of the engine torque to the right mount 20 pulls its associated piston 44 in hydraulic restrainer 48 downward as is apparent from the schematic in FIG. 1. As seen in FIG. 3, this downward force on piston 42 reduces the volume of chamber 62 and compressing the hydraulic fluid therein.

Thus both hydraulic restrainers 46 and 48 are compressing the fluid in the torque compensation mechanism 45 and the check valve 105 of the accumulator/reservoir 100 prevents the higher pressure due to the engine torque from forcing fluid from the hydraulic restrainers 46 and 48 into the reservoir cavity 106. Because the torque compensation mechanism 45 is sealed, the incompressible nature of the hydraulic fluid provides relatively stiff resistance to the engine torque. Furthermore, because the components of the hydraulic restrainers 46 and 48 are formed of metal which also is relatively incompressible, that present torque compensation mechanism 45 provides significantly greater stiffness to torsional movement than prior hydraulic systems in which the fluid chambers were partially defined by elastomeric material.

The hydraulic torque compensation system does not react to vertical engine movement which are accommodated through fluid transfer between the opposite hydraulic restrainers 46 and 48 allowing for free vertical movement of the engine. Specifically with reference to FIG. 1, an upward movement of engine 10 causes the hydraulic fluid to be forced out of the left hydraulic restrainer 48 through the tubes 92 and 68 and the accumulator/reservoir 100 into the expanding chamber of the right hydraulic restrainer 46. Downward vertical movement of the engine 10 produces the opposite flow of fluid between the two hydraulic restrainers 46 and 48. This fluid transfer in reaction to vertical movement creates damping at low frequencies.

The torque compensation mechanism 45 compliments resilient mount mounts 18, 20 and 22 which are designed for compression stiffness, but provide minimal shear resistance to the engine torque. The resilient mounts 18–22 provide a relatively soft connection for vertical and horizontal translation of the aircraft engine 10 with respect to the airframe. This soft connection reduces transmission of vibration from the engine to the airframe. The hydraulic restrainers 46 and 48 provide a relatively stiff coupling between the engine and the airframe structural member 16 with respect to torsional movement of the engine. As a result this support system provides both a relatively low degree of freedom (high stiffness) in the torsional direction 14 and a high degree of freedom (relative softness) along the translational axes. Thus the system reacts to torque loads while remaining relatively soft to transitional movement.

We claim:

1. A suspension system for attaching an engine to a frame of a vehicle wherein the engine exerts torque on the frame and has opposing first and second sides, the suspension system comprising:

a first resilient mount having a first member connected to the first side of the engine, a second member connected to the frame and elastomeric material in contact with the first and second members;

a second resilient mount having a third member connected to the second side of the engine, a fourth member connected to the frame and elastomeric material in contact with the third and fourth members;

a first hydraulic restrainer having a first body fixedly connected to the frame with a first bore in the first body, a first piston slideably located within the first bore to define a first chamber therein which contains hydraulic fluid, the first piston coupled to the first side of the engine, wherein the torque exerted by the engine urges the first piston to reduce the first chamber in volume;

a second hydraulic restrainer having a second body connected to the frame with a second bore in the second body, a second piston slideably located within the second bore to define a second chamber therein which contains hydraulic fluid, the second piston coupled to the second side of the engine, wherein the torque exerted by the engine urges the second piston to reduce the second chamber in volume; and a conduit connecting the first chamber and the second chamber for hydraulic fluid to flow therebetween in response to translational movement of the engine.

2. The suspension system as recited in claim 1 wherein the first piston has an annular flange disposed within the first bore of the first hydraulic restrainer.

3. The suspension system as recited in claim 1 wherein the first piston has a first annular flange disposed within the first bore of the first hydraulic restrainer; and the second piston has a second annular flange disposed within the second bore of the second hydraulic restrainer.

4. The suspension system as recited in claim 3 wherein the first chamber is defined in the first bore below the first annular flange; and the second chamber is defined in the second bore above the second annular flange.

5. The suspension system as recited in claim 1 further comprising a reservoir to which the conduit is connected to supply fluid to the first and second hydraulic restrainers.

6. The suspension system as recited in claim 5 wherein the reservoir comprises a housing with bore with a control piston therein, thereby defining a variable cavity connected to the conduit; and a spring biasing the control piston in a direction that tends to reduce the variable cavity in volume.

7. A suspension system for attaching an engine to a frame of a vehicle wherein the engine exerts torque on the frame and has opposing first and second sides, the suspension system comprising:

a first resilient mount having a plate connected to the first side of the engine and having elastomeric material between the plate and the frame;

a second resilient mount having another plate connected to the first side of the engine and having elastomeric material between the other plate and the frame;

a first hydraulic restrainer having a first body fixedly connected to the frame with a first bore in the first body, a first piston slideably located within the first bore to define a first chamber therein which contains hydraulic fluid, the first piston coupled to the plate of the first resilient mount, wherein the torque exerted by the engine urges the first piston to reduce the first chamber in volume;

a second hydraulic restrainer having a second body connected to the frame with a second bore in the second body, a second piston slideably located within the second bore to define a second chamber therein which contains hydraulic fluid, the second piston coupled to the plate of the second resilient mount, wherein the torque exerted by the engine urges the second piston to reduce the second chamber in volume; and a conduit connecting the first chamber and the second chamber for hydraulic fluid to flow therebetween in response to translational movement of the engine.

8. The suspension system as recited in claim 7 wherein each of the first and second resilient mounts further comprises:

the plate having an aperture therethrough and two opposing surfaces;

first and second resilient pads of elastomeric material with each one of the first and second resilient pads abutting a different one of the two opposing surfaces of the plate;

first and second mounting plates abutting the first and second resilient pads which are sandwiched between the first and second mounting plates, each of the first and second mounting plates having an aperture; and a fastener extending through the apertures in the first and second mounting plates and the mounting member for attaching to the frame of the vehicle.

9. The suspension system as recited in claim 8 wherein the plate of each of the first and second resilient mounts has a tab extending therefrom and pivotally connected to one of the first and second pistons.

10. The suspension system as recited in claim 8 wherein the plate of the first resilient mount has a first tab; the first piston has a first pair of spaced apart ears between which the first tab extends and is pivotally coupled thereto; the plate of the second resilient mount has a second tab; the second piston has a second pair of spaced apart ears between which the second tab extends and is pivotally coupled thereto.

11. The suspension system as recited in claim 7 wherein the first piston has a first annular flange disposed within the first bore of the first hydraulic restrainer; and the second piston has a second annular flange disposed within the second bore of the second hydraulic restrainer.

12. The suspension system as recited in claim 11 wherein the first chamber is defined in the first bore below the first annular flange; and the second chamber is defined in the second bore above the second annular flange.

13. The suspension system as recited in claim 7 wherein:

the first piston comprises a first shaft with a first end coupled to the plate of the first resilient mount, and a first flange disposed around the first shaft thereby defining the first chamber between the first flange and the first end; and the second piston comprises a second shaft with a second end coupled to the plate of the second resilient mount, and a second flange disposed around the second shaft thereby defining the second chamber on a side of the second flange that is remote from the second end.

14. The suspension system as recited in claim 7 further comprising a reservoir to which the conduit is connected to supply fluid to the first and second hydraulic restrainers.

15. The suspension system as recited in claim 14 wherein the reservoir comprises a housing with bore with a control piston therein, thereby defining a variable cavity connected to the conduit; and a spring biasing the control piston in a direction that tends to reduce the variable cavity in volume.

16. A suspension system for attaching an engine to a frame of a vehicle wherein the engine exerts torque on the frame and has opposing first and second sides, the suspension system comprising:

a first resilient mount including a first plate fixedly attached to the first side of the engine and having an aperture therethrough, a first annular pad of elastomeric material abutting one side of the first plate, a second annular pad of elastomeric material abutting another side of the first plate that is opposite to the one side, first and second mounting plates abutting the first and second resilient pads which are sandwiched between the first and second mounting plates which have aperture therethrough, and a first fastener extending through the first plate, the first and second annular pads, and the first and second mounting plates for attaching to the frame of the vehicle;

a second resilient mount including a second plate fixedly attached to the second side of the engine and having an aperture therethrough, a third annular pad of elastomeric material abutting one side of the second plate, a fourth annular pad of elastomeric material abutting another side of the second plate that is opposite to the one side, third and fourth mounting plates abutting the third and fourth resilient pads which are sandwiched between the third and fourth mounting plates which have aperture therethrough, and a second fastener extending through the first plate, the first and second third and fourth annular pads, and the first and second third and fourth mounting plates for attaching to the frame of the vehicle;

a first hydraulic restrainer having a first body fixedly attached to the frame with a first bore in the first body, a first piston slideably located within the first bore to define a first chamber therein which contains hydraulic fluid, the first piston pivotally coupled to the first plate wherein the torque exerted by the engine urges the first piston to reduce the first chamber in volume;

a second hydraulic restrainer having a second body fixedly attached to the frame with a second bore in the second body, a second piston slideably located within the second bore to define a second chamber therein which contains hydraulic fluid, the second piston pivotally coupled to the second plate wherein the torque exerted by the engine urges the second piston to reduce the second chamber in volume;

a conduit connecting the first chamber and the second chamber for hydraulic fluid to flow therebetween; and an accumulator having a reservoir containing hydraulic fluid and connected to the conduit by a check valve which permits fluid to flow substantially only from the reservoir to the conduit.

17. The suspension system as recited in claim 16 wherein the first piston has a first shaft with a first end connected to the first plate and a first flange disposed around the first shaft thereby defining the first chamber between the first flange and the first end; and the second piston has a second shaft with a second end connected to the second plate and a second flange disposed around the second shaft thereby defining the second chamber on a side of the second flange that is remote from the second end.

* * * * *